United States Patent
Siegfriedsen (10) Patent No.: US 12,097,934 B2
(45) Date of Patent: Sep. 24, 2024

(54) WIND TURBINE COMPRISING A FLOATING FOUNDATION HAVING A PLURALITY OF BUOYANCY BODIES

(71) Applicant: Aerodyn Consulting Singapore PTE LTD, Singapore (SG)

(72) Inventor: Sönke Siegfriedsen, Rendsburg (DE)

(73) Assignee: Aerodyn Consulting Singapore PTE LTD, Singapore (SG)

( * ) Notice: Subject to any disclaimer, the term of this patent is extended or adjusted under 35 U.S.C. 154(b) by 399 days.

(21) Appl. No.: 17/623,755

(22) PCT Filed: Jun. 24, 2020

(86) PCT No.: PCT/IB2020/000448
§ 371 (c)(1),
(2) Date: Dec. 29, 2021

(87) PCT Pub. No.: WO2021/005413
PCT Pub. Date: Jan. 14, 2021

(65) Prior Publication Data
US 2022/0250722 A1      Aug. 11, 2022

(30) Foreign Application Priority Data
Jul. 9, 2019   (DE) .......................... 102019118564.5

(51) Int. Cl.
*B63B 35/44*   (2006.01)
*B63B 1/04*    (2006.01)
(Continued)

(52) U.S. Cl.
CPC ................ *B63B 35/44* (2013.01); *B63B 1/04* (2013.01); *B63B 5/24* (2013.01); *F03D 13/25* (2016.05); *B63B 2005/242* (2013.01); *B63B 2035/446* (2013.01); *F05B 2240/93* (2013.01); *F05B 2240/95* (2013.01)

(58) Field of Classification Search
CPC .. B63B 35/44; B63B 1/04; B63B 5/24; B63B 2005/242; B63B 2035/446; F03D 13/25; F05B 2240/93; F05B 2240/95
See application file for complete search history.

(56) References Cited

U.S. PATENT DOCUMENTS

| | | |
|---|---|---|
| 2013/0276691 A1 | 10/2013 | Thieffry |
| 2017/0190391 A1 | 7/2017 | Siegfriedsen |
| 2018/0118309 A1 | 5/2018 | Perdrizet |

FOREIGN PATENT DOCUMENTS

| | | |
|---|---|---|
| CN | 2811161 | 8/2006 |
| DE | 102016118079 | 9/2017 |

(Continued)

*Primary Examiner* — Stephen P Avila
(74) *Attorney, Agent, or Firm* — Jordan IP Law, LLC (57) ABSTRACT

A wind turbine includes a floating foundation having a plurality of buoyancy bodies, the buoyancy bodies being formed from a plurality of buoyancy body elements designed as hollow bodies, which are arranged adjacent to one another in a first plane concentrically around each central element extending from the floating foundation and are connected to said central element. Each buoyancy body element has a surface supported on the central element, a convex surface arranged opposite the central element, and two lateral surfaces each supported on a lateral surface of an adjacent buoyancy body element.

16 Claims, 7 Drawing Sheets

(51) Int. Cl.
*B63B 5/24* (2006.01)
*F03D 13/25* (2016.01)

(56) References Cited

FOREIGN PATENT DOCUMENTS

| | | | |
|---|---|---|---|
| EP | 2479101 | 7/2012 | |
| EP | 3019740 | 11/2017 | |
| FR | 2977857 A1 * | 1/2013 | ............. B63B 1/107 |
| FR | 2995871 A1 * | 3/2014 | ............. B63B 1/107 |
| FR | 3074138 | 5/2019 | |
| WO | WO2014044453 | 3/2014 | |
| WO | WO2017206976 | 12/2017 | |

* cited by examiner

WIND TURBINE COMPRISING A FLOATING FOUNDATION HAVING A PLURALITY OF BUOYANCY BODIES

CROSS-REFERENCE TO RELATED APPLICATIONS

This application represents the U.S. National Phase of International Application number PCT/IB2020/000448, entitled "Wind Turbine Comprising a Floating Foundation having a Plurality of Buoyancy Bodies", filed 24 Jun. 2020, which claims benefit to German patent document DE10 2019 118 564.5, filed 9 Jul. 2019, all of which are incorporated herein by reference.

BACKGROUND OF THE INVENTION

The invention relates to a wind turbine comprising a floating foundation having a plurality of buoyancy bodies.

From EP 3 019 740 B1, a particularly advantageously designed floating wind turbine is known which has a Y-shaped foundation that extends in one plane and is designed to be buoyant by the provision of buoyancy bodies connected to the foundation. Although EP 3 019 740 B1 does not contain any special statements regarding the design of the buoyancy bodies, the applicant's further patent applications, for example DE 10 2016 118 079 B3 or WO 2017/206976 A1, indicate that the buoyancy bodies should advantageously be rigidly connected to the foundation. For example, the buoyancy bodies can form the closure of a floating foundation made of concrete and can themselves be made of steel.

WO 2014/044453 A1 discloses another type of floating foundation in the form of a triangular foundation which extends in one plane and at the corner points of which support columns made of steel and extending out of the plane of the triangle are arranged. The triangle is equilateral, the support columns being inclined toward the outside of the triangle following the respective medians. Each support column is set up such that—in relation to the triangular foundation—a floating structure is fastened to the outside thereof, each floating structure being formed from a cage that accommodates a large number of small buoyancy chambers.

An alternative design is known from EP 2 479 101 B1, in which the buoyancy bodies are in the form of rings arranged around the support columns. This design largely corresponds to the structure known from CN 2811161 Y for the formation of a floating body, in which a plurality of annular buoyancy bodies is arranged around a central pipe.

The disadvantage of the known buoyancy bodies is that they are very complex to manufacture and complex to assemble, either because they are made from steel or because they are made of small pieces. One-piece production of a floating body, due to its size, can cause considerable problems during transport, whereas production of a floating body from small pieces entails increased material expenditure and problems during installation. In particular, the designs made of small pieces lead to all-round, especially hydrostatic, pressure loads which—depending on the immersion depth—place increased demands on the structure and on the material used for the floating bodies. The known designs thus stand in the way of a lightweight, material-compatible design of a floating body.

SUMMARY OF THE INVENTION

The object of the invention is therefore to provide a floating wind turbine comprising a floating foundation which has a plurality of buoyancy bodies and which can be manufactured in a manner that is material-compatible and requires little labor, in particular with regard to the buoyancy bodies.

This object is achieved according to the invention by the wind turbine having the features of claim 1. The dependent claims reflect advantageous embodiments of the invention.

According to the invention, a wind turbine comprising a floating foundation having a plurality of buoyancy bodies is provided, the buoyancy bodies being formed from a plurality of buoyancy body elements, said elements being arranged next to one another in a first level concentrically around a relevant central element that extends from the floating foundation, and being detachably connectable to said central element, each buoyancy body element having a surface supported on the central element, a convex surface arranged opposite the central element, and two side surfaces each supported on a side surface of an adjacent buoyancy body element.

The outer wall forming the convex surface preferably has greater buckling strength due to a greater wall thickness than the walls forming the side surfaces or due to the formation as a sandwich part. This design as a convex surface having increased dimensional stability is useful because the hydrostatic water pressure presses on each outer wall due to the immersion of the buoyancy bodies in the water.

This specific design allows buoyancy bodies to be produced which withstand the hydrostatic pressure loads with minimal use of materials. In particular, the outer wall forming the convex surface has a greater wall thickness than the side walls and/or is in the form of a sandwich structure, such that, through the local use of the reinforced structure of the outer wall on which the external pressure load is applied, material can be saved on the mutually supporting structures of the buoyancy body elements. Overall, this results in a significantly more lightweight structure, which has a positive effect not only on the transportation of the elements, but also on the total weight and the costs of the wind turbine.

It is specifically provided that the outer wall forming the convex surface has a wall thickness between 1.2 and 2.5 times thicker than the walls forming the side surfaces At least one further level of buoyancy body elements arranged below the first level is preferably provided, which buoyancy body elements are arranged around a relevant central element and are detachably connected to said central element. The size of the floating wind turbine requires the floating body to be dimensioned, which preferably requires a multi-part design of the floating body. In contrast to the "small-pieces" approach pursued in the prior art, provision is made in the present case to use the smallest possible number of buoyancy body elements, which elements are advantageously arranged in (two) levels.

The buoyancy body elements arranged deeper in the further level are preferably designed to have thicker walls than the buoyancy body elements arranged in the first level so that they can withstand the higher pressures prevailing at greater water depths. Alternatively or additionally, the buoyancy body elements are subjected to increased air pressure in order to counteract the external water pressure and thereby save on material thickness in the structure. It is advantageous in that case for the buoyancy body elements arranged in the further level to have a higher pneumatic internal pressure than the buoyancy body elements arranged in the first level, in order to thus withstand the higher external pressure.

The convex surfaces of the buoyancy body elements preferably together form, for example, a circle when viewed in cross section through the assembled buoyancy body elements. Correspondingly, the buoyancy body elements are in the shape of a sector of a circle.

A circular cross section of the buoyancy bodies is expedient when using a stationary floating foundation of a floating wind turbine, it being possible for the waves to hit the buoyancy bodies from all sides—in contrast to floating wind turbines, which are connected to the sea floor by a single mooring point and align completely with the wind direction in the water. For the last-mentioned type of turbines, the extreme waves in storm conditions will always run in the direction of the main axis of the floating structure. The extreme waves determine the dimensions of the buoyancy body structure and the components for connection to the foundation as well as the mooring elements and anchors of such turbines, with a significantly more favorable design being achieved for these types of turbines in that the convex surfaces of the buoyancy body elements together are in the form of a single streamlined cross section, such as a teardrop shape, an ellipse or a lens, when viewed in cross section through the combined buoyancy body elements.

Investigations by the applicant have shown that the wave resistance of an elliptical floating body is smaller by a factor of three than a correspondingly circular floating body having the same buoyancy force. If, however, the elliptical shape of the floating bodies can achieve a lower maximum wave resistance in extreme conditions, it is possible to reduce the dimensions of the anchors, chains, wire cables and fastening elements required to anchor the floating wind turbine to the bed of the body of water, resulting in lower material and work input as well as a lower cost.

In particular, the ratio of length to width of the ellipse is expediently approximately 2:1. The longer axis of the buoyancy body is aligned in the direction of the waves.

The length and/or the width of the individual buoyancy body elements more preferably corresponds to the outer dimensions of an ISO container. In particular, the dimensions of the buoyancy body elements correspond to the dimensions of a 40-foot container, and therefore they can easily be transported on the road by means of trailers. In particular, the buoyancy body elements have a diameter or edge length of approximately 2.5 m and a length of approximately 12 m.

As a result of the transportability that is made possible or at least improved, it is possible to manufacture the floating bodies at a location other than the location of the final assembly of the floating wind turbine as such. In addition, the amount of work resulting from the multi-part construction of the floating bodies is kept as low as possible.

According to another preferred embodiment, the central element has a polygonal cross section, such that the position of the individual buoyancy body elements is predetermined and fixed. This also allows simple troubleshooting and, if necessary, replacement of an individual buoyancy body element should it be defective.

The buoyancy body elements are preferably hollow bodies made of plastics material, in particular glass-fiber reinforced plastics material, with optionally provided sandwich surfaces for buckling stabilization, allowing a particularly lightweight structure of the floating body.

The buoyancy body elements can also have or consist of foamed plastics material. In particular, the buoyancy body elements can be in the form of filled foam bodies, it being possible for the foam to be open-cell, mixed-cell or closed-cell. In any case, the penetration of water into the buoyancy body must be counteracted, and therefore the foam body preferably has a water-repellent coating. This is particularly preferably in the form of a shrink film, specifically as a shrink tube, with a cold shrink tube being most preferably used.

The buoyancy body elements are preferably fastened to the central element by a plurality of clamps, each clamp fastening the buoyancy body elements to the central element, the buoyancy body elements particularly preferably having, on their convex surface, at least one recess which extends transversely to their longitudinal axes and is intended for receiving at least one clamp.

BRIEF DESCRIPTION OF THE FIGURES

In the following, the invention shall be described in more detail using a particularly preferably designed embodiment shown in the accompanying drawings, in which.

DETAILED DESCRIPTION OF THE PREFERRED EMBODIMENTS

Figure 1:
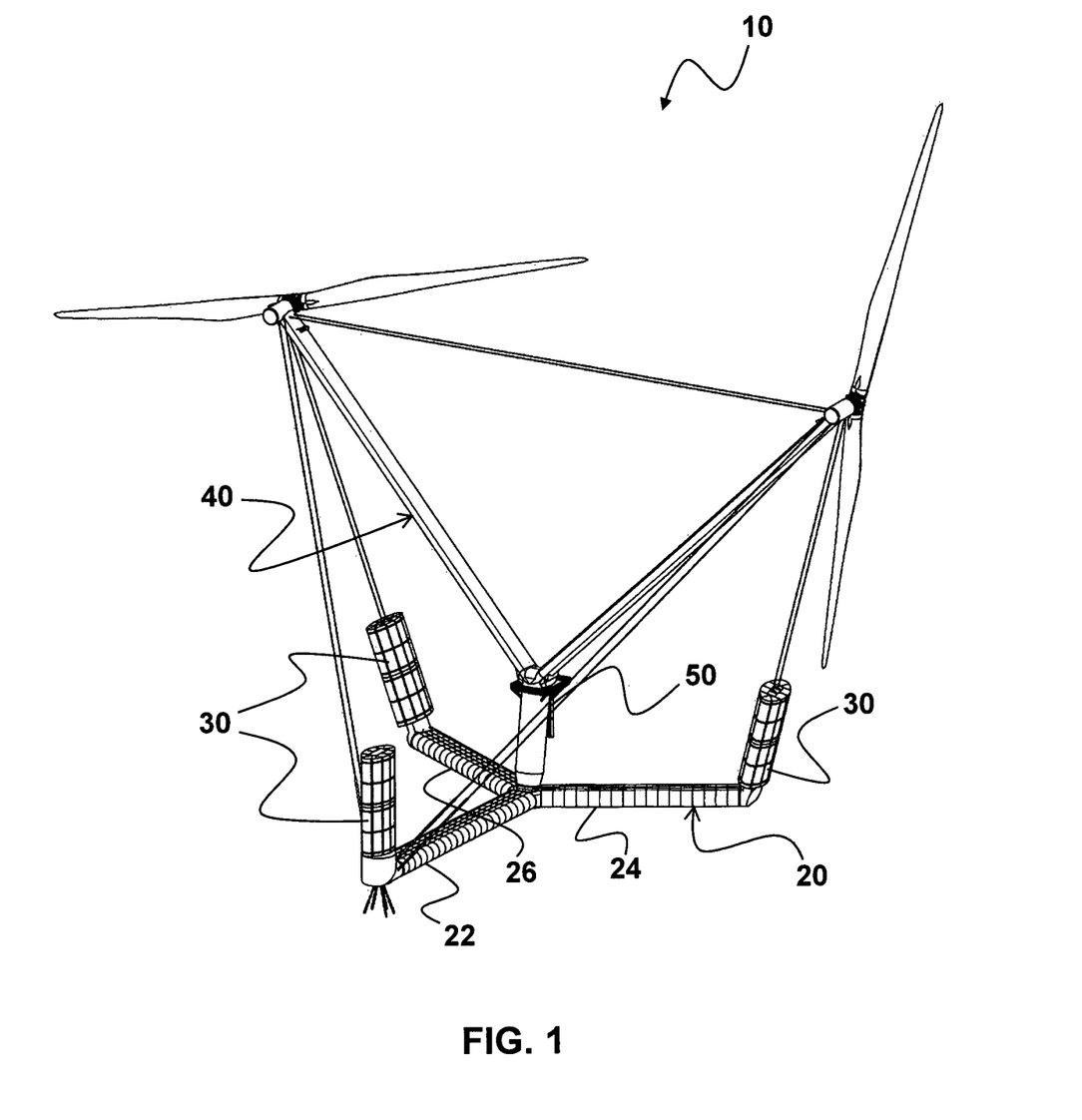
FIG. 1 is a perspective view of a first embodiment of a floating wind turbine according to the invention comprising buoyancy bodies that are elliptical when viewed in cross section.

FIG. 1 shows a perspective view of a first embodiment of a floating wind turbine according to the invention comprising buoyancy bodies that are elliptical when viewed in cross section. The floating wind turbine 10 has the Y-shaped floating foundation 20 known in this type of turbine and having three buoyancy bodies 30 which are attached to the free ends of the arms 22, 24, 26 that form the foundation 20. The buoyancy bodies 30 are elliptical in cross section and also serve to guy the tower 40 of the wind turbine 10 by means of appropriately provided cables 50, the tower having two energy conversion units.

Figure 2:
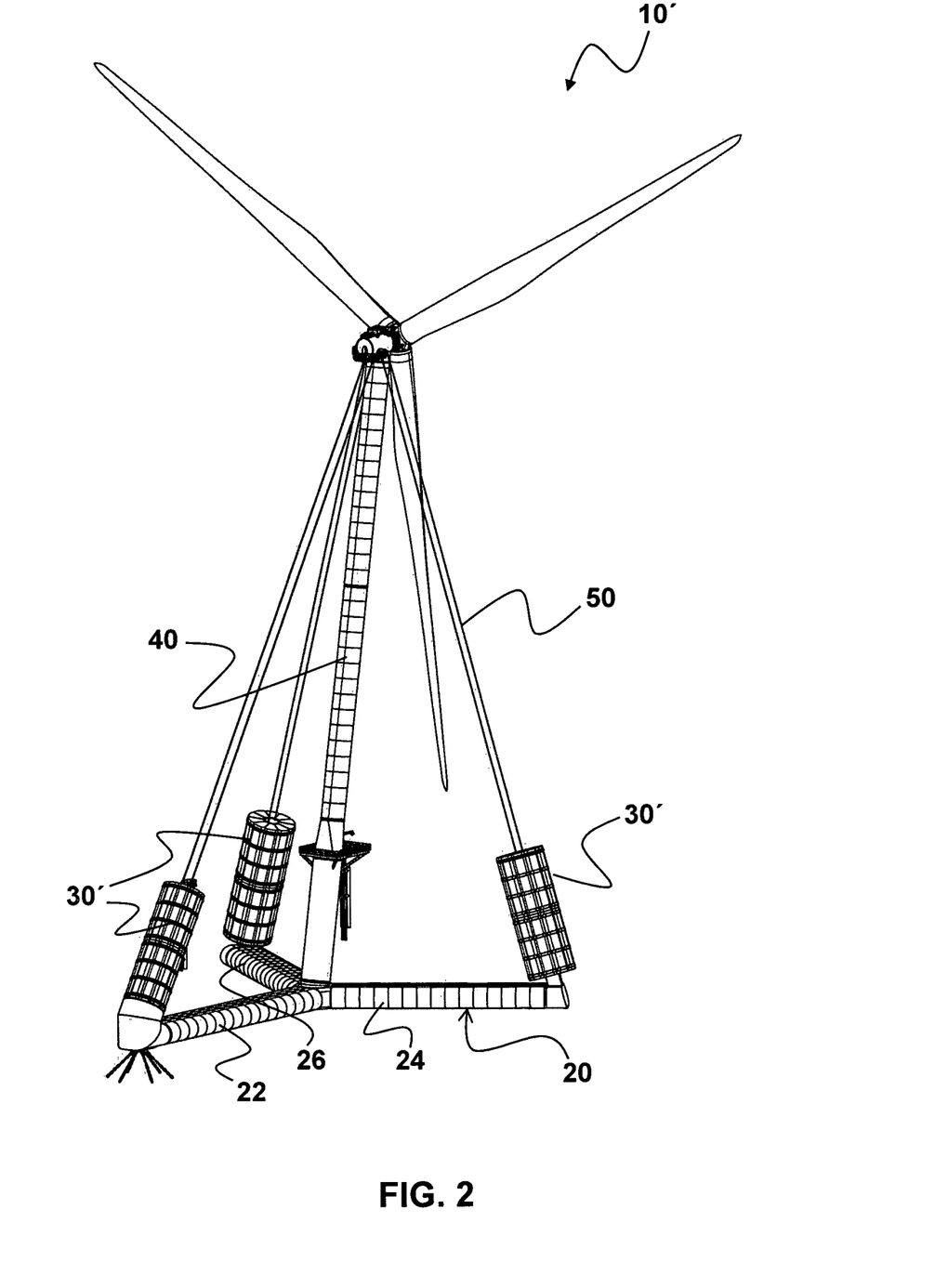
FIG. 2 is a perspective view of a second embodiment of a floating wind turbine according to the invention comprising buoyancy bodies that are circular when viewed in cross section.

An alternative design to the wind turbine 10 shown in FIG. 1 is shown in FIG. 2, which is a perspective view of a second embodiment of a floating wind turbine 10' according to the invention comprising buoyancy bodies 30 that are circular when viewed in cross section. This floating wind turbine 10' also has a Y-shaped floating foundation 20 having three buoyancy bodies 30' which are fastened to the free ends of the arms 22, 24, 26 that form the foundation 20. In contrast to the turbine 10' shown in FIG. 1, the buoyancy bodies 30 are circular in cross section, but are also used to guy the tower 40 of the wind turbine 10' by means of correspondingly provided cables 50.

The resulting differences in the structure of the buoyancy bodies between the two embodiments implementing the invention can be found in the following drawings, which each show details of the turbines.

Figure 3:
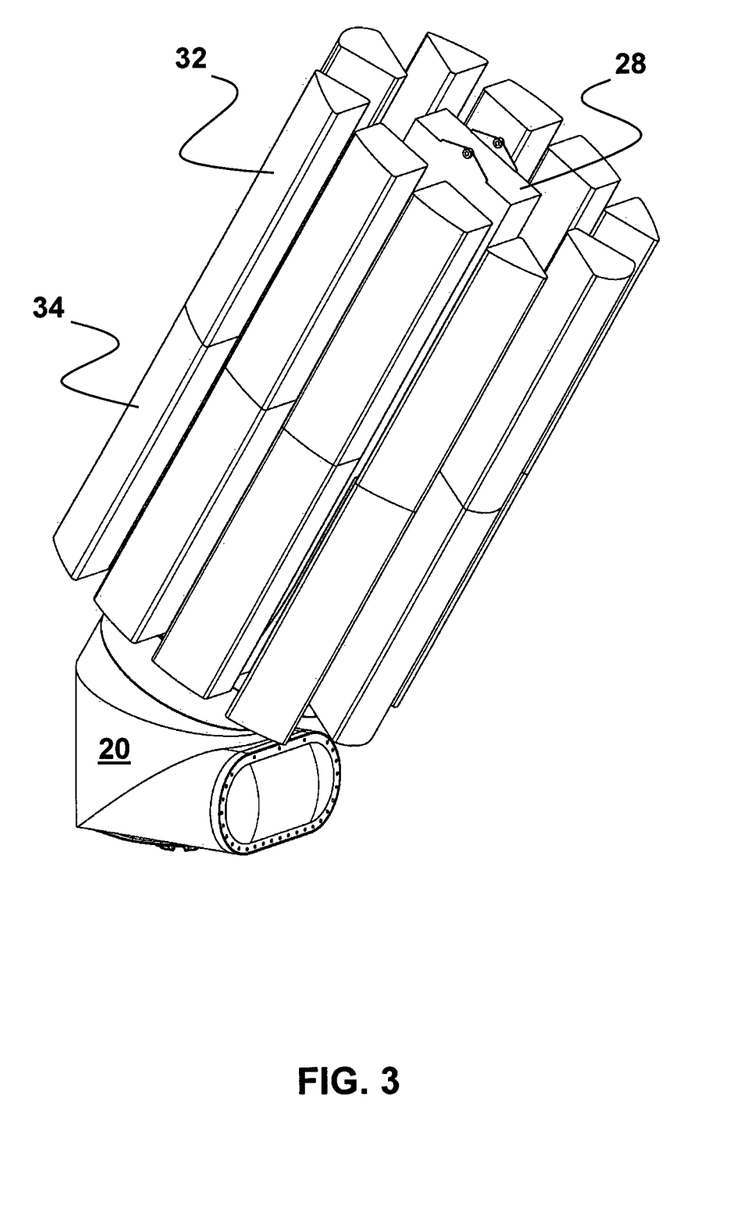
FIG. 3 is a detailed exploded view of the wind turbine from FIG. 1.

Thus, FIG. 3 shows a detailed exploded view of the wind turbine from FIG. 1, in which some of the components of the wind turbine 10 shown in FIG. 1 have been omitted for a better overall view. FIG. 3 thus shows only a portion of the foundation 20, which is connected to a central element 28 extending out of the plane of the foundation 20, around which central element a plurality of buoyancy body elements 32, 34 is arranged, forming the buoyancy body 30.

In the example shown, the buoyancy body 30 is formed from a plurality of buoyancy body elements 32, 34 in the form of hollow bodies, which buoyancy body elements are arranged next to one another in two levels concentrically around the central element 28 that extends from the floating foundation 20. The buoyancy body elements 32, 34 are detachably connected to the central element 28 such that, for example, if a buoyancy body element 32, 34 is damaged, simple replacement can take place.

Each buoyancy body element 32, 34 has a surface supported on the central element 28, a convex surface arranged opposite the central element 28, and two side surfaces each supported on a side surface of an adjacent buoyancy body element 32, 34. The convex surfaces of the buoyancy body elements 32, 34 together form an ellipse when viewed in cross section through the buoyancy body elements 32, 34, such that the buoyancy body 30 as a whole has an elliptical shape in cross section. The outer wall forming the convex surface has a greater wall thickness than the walls forming the side surfaces. In particular, the outer wall forming the convex surface has a greater wall thickness than the walls forming the side surfaces, or a sandwich shell, and is thus able to counteract the hydrostatic water pressure acting exclusively from the outside on the floating body 30, while having a relatively lightweight construction.

In addition, the further level of buoyancy body elements 34 arranged below the first level have thicker walls than the buoyancy body elements 32 arranged in the first level, and can also have a higher pneumatic internal pressure than the buoyancy body elements 32 arranged in the first level. These measures take into account the higher pressure conditions that prevail in greater water depths and that act on the buoyancy body elements 34.

Figure 4:
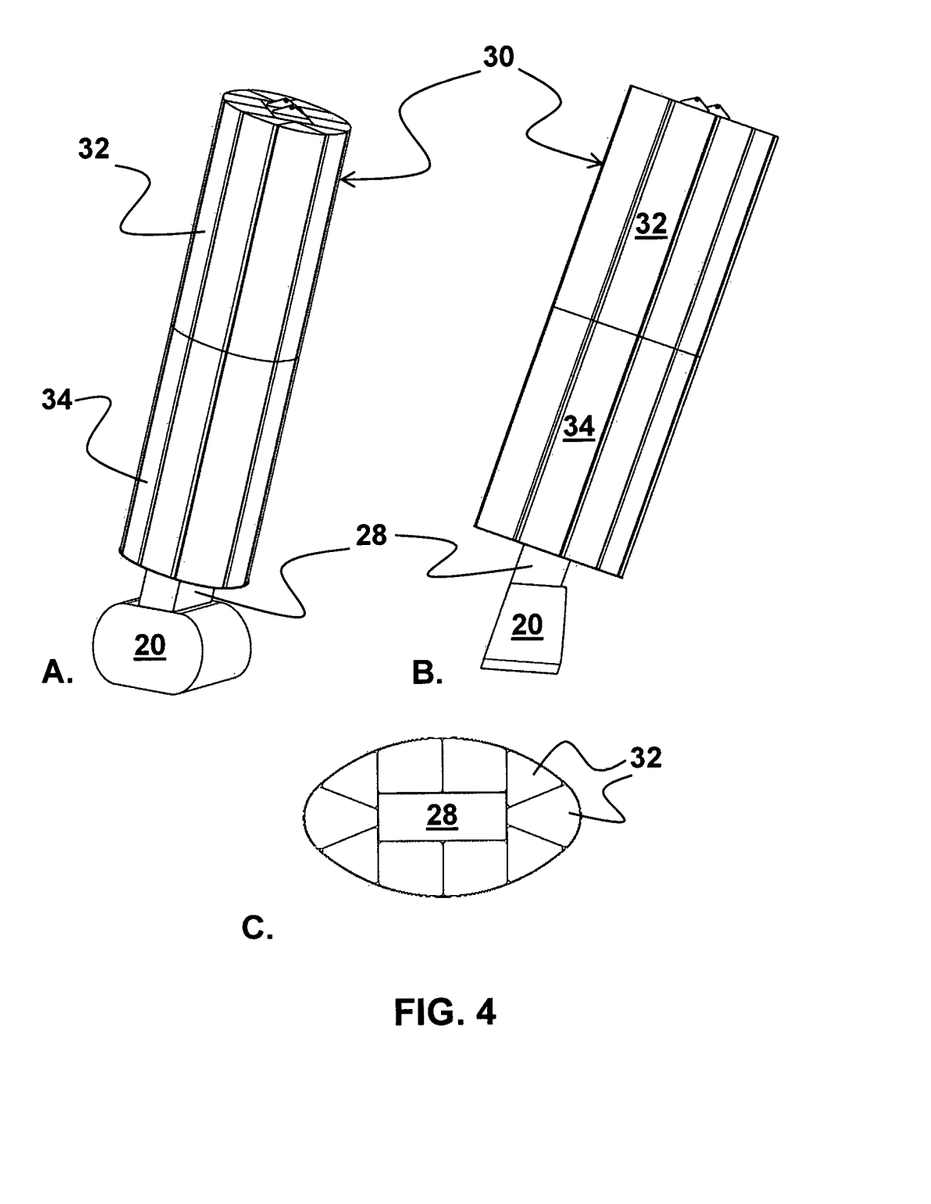
FIG. 4 shows a detail of an elliptical buoyancy body in a perspective view (A), a side view (B) and in plan view (C)

This advantageous design is also clear in FIG. 4, which shows a detail of a wind turbine designed having elliptical buoyancy bodies in a perspective view (A), a side view (B) and in plan view (C). Although the floating body 30 consists of a plurality of individual components, namely the buoyancy body elements 32, 34 arranged in two levels, the floating body 30 has a surface that is closed to the outside. The hydrostatic pressure forces acting from the outside on the floating body 30 are diverted into the central element 28 via the side walls of the buoyancy body elements 32, 34. The central element 28 also has the connections for the guy cables 50 of the tower 40, such that the central element 28, as a load-transferring component, transfers, to the foundation 20, the hydrostatic and dynamic loads acting on the floating bodies 30 as well as the aerodynamic thrust loads acting on the drivetrain.

The buoyancy body elements 32, 34 are designed such that they correspond approximately to the dimensions of an ISO container and have a length of approximately 12 m and a diameter or edge length of approximately 2.50 m. This design makes it easily possible to transport the buoyancy body elements 32, 34 over land and if necessary water, without special precautions having to be taken for this purpose.

Figure 5:
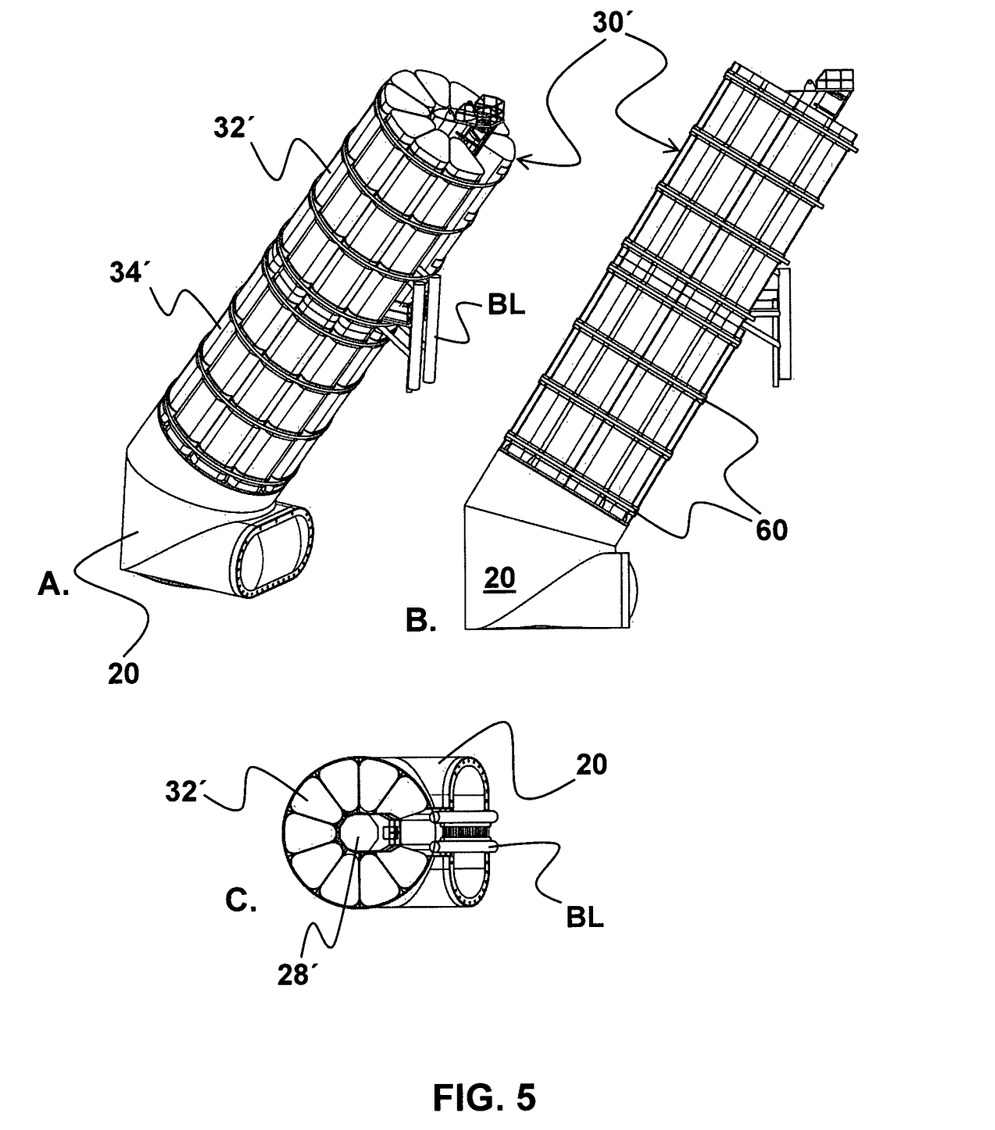
FIG. 5 shows a detail of a wind turbine formed by circular buoyancy bodies in a perspective view (A), a side view (B) and in plan view (C)

The alternative design of the wind turbine 10' with circular buoyancy bodies is shown in FIG. 5 in a perspective view (A), a side view (B) and in plan view (C). Here, too, a central element 28' connected to the foundation 20 of a floating wind turbine 10' is provided, around which central element a plurality of buoyancy body elements 32', 34' is arranged which forms the buoyancy body 30', said buoyancy body elements also being organized in two levels around the central element 28'.

Due to the circular-sector-shaped design of the buoyancy body elements 32', 34' the buoyancy bodies 30' of this embodiment have a circular cross section, the buoyancy body elements 32', 34' being held together by a plurality of clamps 60 that encircle the buoyancy body elements 32', 34', and being fastened to the central element 28'.

In this case, too, each buoyancy body element 32', 34' has a surface supported on the central element 28', a convex surface arranged opposite the central element 28', and two side surfaces each supported on a side surface of an adjacent buoyancy body element 32', 34'. The convex surfaces of the buoyancy body elements 32', 34' together form a circle when viewed in cross section through the buoyancy body elements 32, 34, such that the buoyancy body 30' as a whole has a circular cross section, it also being possible for a boat landing BL to be provided. The outer wall forming the convex surface has a greater wall thickness than the walls forming the side surfaces and is thus able to counteract the hydrostatic pressure acting exclusively from the outside on the floating body 30', while having a relatively lightweight design.

In addition, the walls of the further level of buoyancy body elements 34' arranged below the first level are thicker than those of the buoyancy body elements 32' arranged in the first level, and said further level of buoyancy body elements can also have a higher pneumatic internal pressure than the buoyancy body elements 32' arranged in the first level. These measures take into account the higher pressure ratios that prevail in greater water depths and that act on the buoyancy body elements 34'.

The buoyancy body elements 32', 34' are also designed such that they correspond approximately to the dimensions of an ISO container and have a length of approximately 12 m and a diameter of 2.50 m. This design makes it easily possible to transport the buoyancy body elements 32', 34' over land and if necessary water, without special precautions having to be taken for this purpose.

Figure 6:
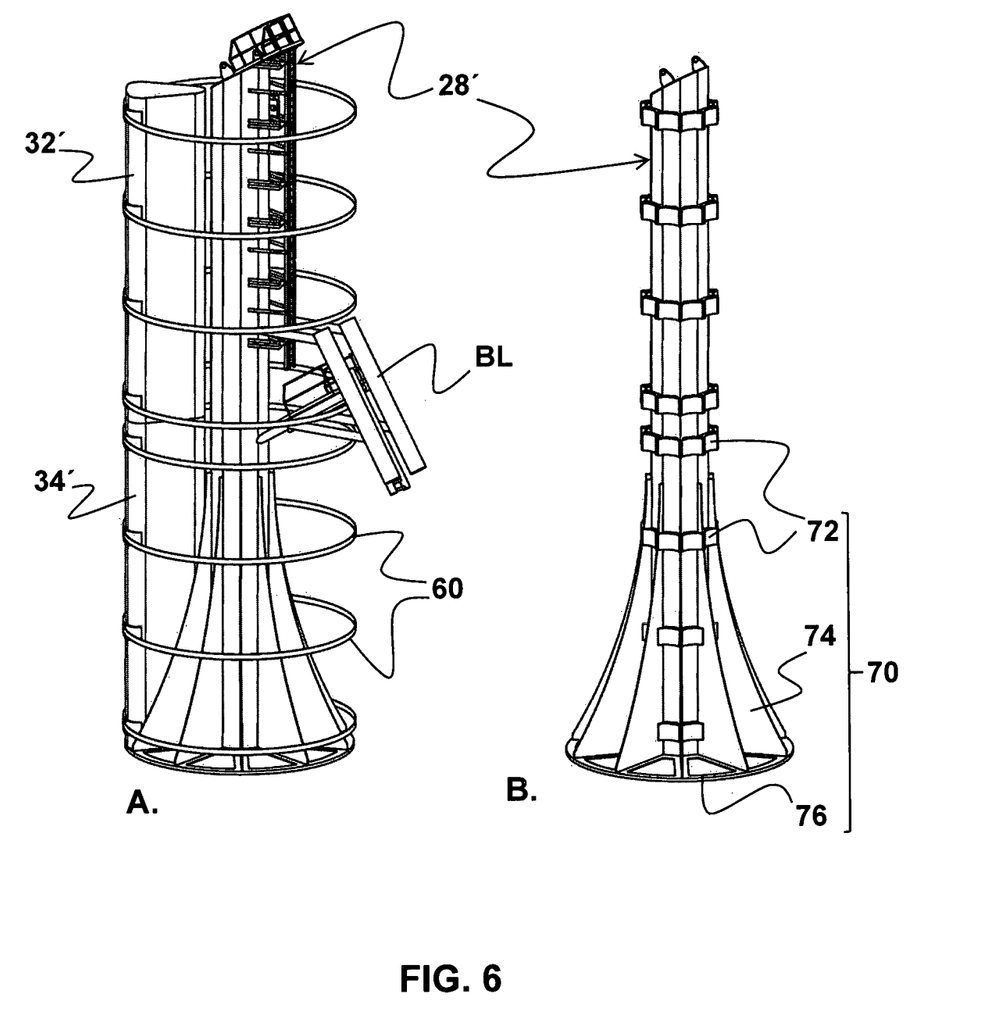
FIG. 6 shows perspective detailed views (A, B) of a particularly preferably designed central element for a circular design of a buoyancy body.

The arrangement of the buoyancy body elements 32', 34' shown in FIG. 5 can take place particularly simply if the central element 28' is designed as shown in FIG. 6 in perspective detailed views (A, B). In particular, ten concentrically arranged buoyancy element are provided on the central element 28', which buoyancy elements hold and fasten in a predetermined position by means of corresponding positioning and fastening aids 70 on the central element 28'. Said aid can be a recess 72 provided on the central element 28', a radially extending wall 74 and/or a perforated plate 76, the holes of which are complementary to the outer contour of the buoyancy body elements 32', 34' and can receive the buoyancy body elements 32', 34'.

This particular design makes it possible in particular to leave a free space in the upper level of buoyancy body elements 32' close to the water surface, in which free space a boat landing BL is inserted.

Figure 7:
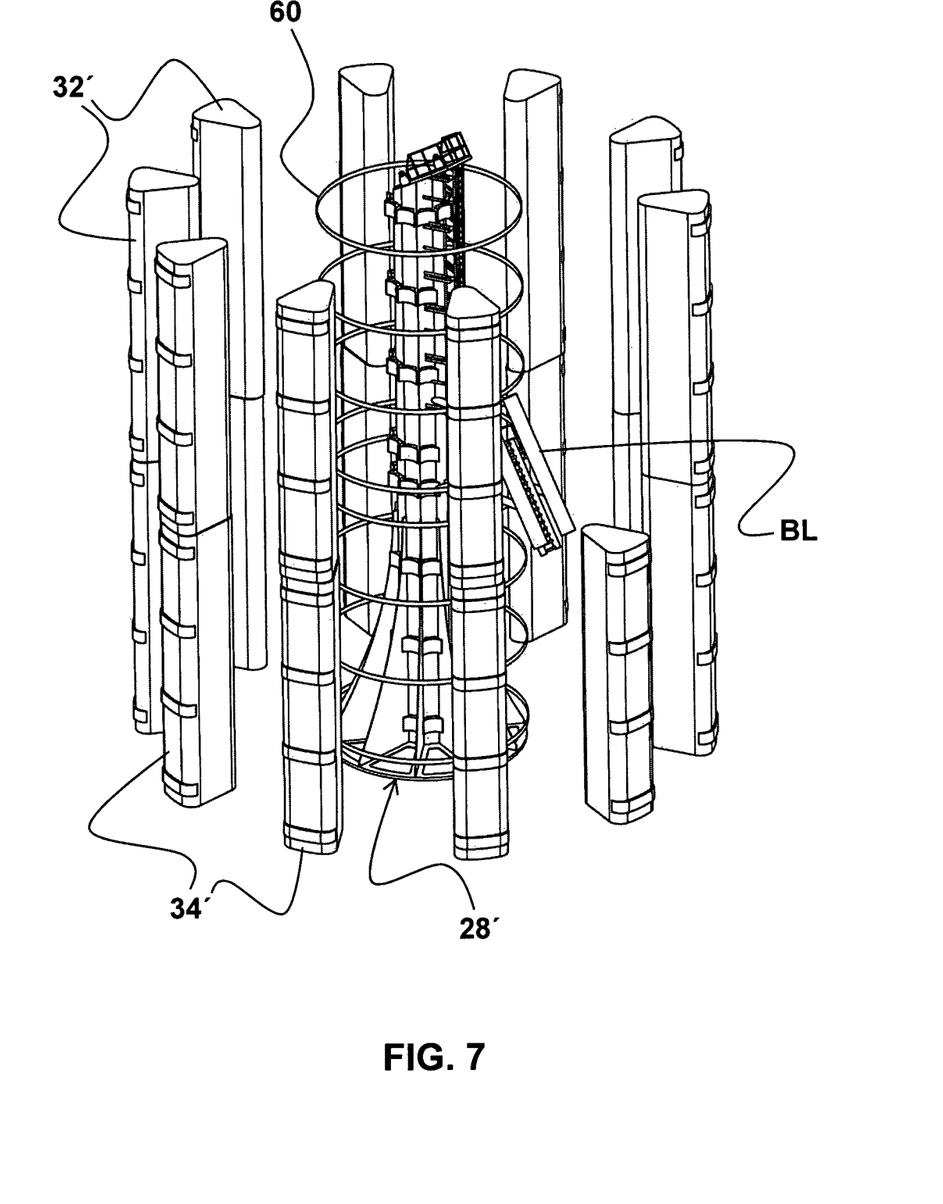
FIG. 7 is a detailed exploded view of the buoyancy body shown in FIG. 5.

Finally, FIG. 7 shows a detailed exploded view of the buoyancy body 30' shown in FIG. 5, including the clamps 60 required for fastening the buoyancy body elements 32', 34' to the central element 28'.

The invention claimed is:

1. A wind turbine comprising
a floating foundation having a plurality of buoyancy bodies, wherein
the buoyancy bodies are formed from a plurality of buoyancy body elements in the form of hollow bodies, which buoyancy body elements are arranged next to one another in a first level concentrically around a relevant central element that extends from the floating foundation, and are connected to said central element, and
each buoyancy body element has a surface supported on the central element, a convex surface arranged opposite the central element, and two side surfaces each supported on a side surface of an adjacent buoyancy body element, wherein an outer wall forming the convex surface has a greater wall thickness than walls forming the side surfaces.

2. The wind turbine according to claim 1, wherein the outer wall forming the convex surface has a wall thickness between 1.2 and 2.5 times thicker than the walls forming the side surfaces.

3. The wind turbine according to claim 1, wherein the outer wall forming the convex surface is in the form of a sandwich shell.

4. The wind turbine according to claim 1, further comprising at least one further level of buoyancy body elements arranged below the first level, which buoyancy body elements are arranged around a relevant central element and are connected to said central element.

5. The wind turbine according to claim 1, wherein the buoyancy body elements are detachably connected to the central element.

6. A wind turbine comprising
a floating foundation having a plurality of buoyancy bodies, wherein
the buoyancy bodies are formed from a plurality of buoyancy body elements in the form of hollow bodies, which buoyancy body elements are arranged next to one another in a first level concentrically around a relevant central element that extends from the floating foundation, and are connected to said central element,
each buoyancy body element has a surface supported on the central element, a convex surface arranged opposite the central element, and two side surfaces each supported on a side surface of an adjacent buoyancy body element, and
at least one further level of buoyancy body elements arranged below the first level, which buoyancy body elements are arranged around a relevant central element and are connected to said central element, wherein the buoyancy body elements arranged in the further level are designed so as to have thicker walls than the buoyancy body elements arranged in the first level.

7. A wind turbine comprising
a floating foundation having a plurality of buoyancy bodies, wherein
the buoyancy bodies are formed from a plurality of buoyancy body elements in the form of hollow bodies, which buoyancy body elements are arranged next to one another in a first level concentrically around a relevant central element that extends from the floating foundation, and are connected to said central element,
each buoyancy body element has a surface supported on the central element, a convex surface arranged opposite the central element, and two side surfaces each supported on a side surface of an adjacent buoyancy body element, and
at least one further level of buoyancy body elements arranged below the first level, which buoyancy body elements are arranged around a relevant central element and are connected to said central element, wherein the buoyancy body elements arranged in the further level have a higher pneumatic internal pressure than the buoyancy body elements arranged in the first level.

8. The wind turbine according to claim 1, wherein the convex surfaces of the buoyancy body elements together form a circle when viewed in cross section through the buoyancy body elements.

9. The wind turbine according to claim 1, wherein the convex surfaces of the buoyancy body elements together have a streamlined cross-sectional shape, in particular an ellipse, a lens or a teardrop shape, when viewed in cross section through the buoyancy body elements.

10. A wind turbine comprising
a floating foundation having a plurality of buoyancy bodies, wherein
the buoyancy bodies are formed from a plurality of buoyancy body elements in the form of hollow bodies, which buoyancy body elements are arranged next to one another in a first level concentrically around a relevant central element that extends from the floating foundation, and are connected to said central element, and
each buoyancy body element has a surface supported on the central element, a convex surface arranged opposite the central element, and two side surfaces each supported on a side surface of an adjacent buoyancy body element, wherein the convex surfaces of the buoyancy body elements together have a streamlined cross-sectional shape, in particular an ellipse, a lens or a teardrop shape, when viewed in cross section through the buoyancy body elements and the ratio of length to width of the streamlined cross-sectional shape is 2:1.

11. The wind turbine according to claim 1, wherein the axial length and the maximum diameter of the buoyancy body elements correspond to the outer dimensions of an ISO container.

12. The wind turbine according to claim 1, wherein the buoyancy body elements have a diameter of 2.5 m and a length of 12 m.

13. The wind turbine according to claim 1, wherein the central element has a polygonal cross section.

14. The wind turbine according to claim 1, wherein the buoyancy body elements are hollow bodies made of plastics material, in particular glass-fiber reinforced plastics material.

15. The wind turbine according to claim 1, further comprising a plurality of clamps, each clamp fastening the buoyancy body elements to the central element.

16. A wind turbine comprising
a floating foundation having a plurality of buoyancy bodies, wherein
the buoyancy bodies are formed from a plurality of buoyancy body elements in the form of hollow bodies, which buoyancy body elements are arranged next to one another in a first level concentrically around a relevant central element that extends from the floating foundation, and are connected to said central element,
each buoyancy body element has a surface supported on the central element, a convex surface arranged opposite the central element, and two side surfaces each supported on a side surface of an adjacent buoyancy body element and a plurality of clamps, each clamp fastening the buoyancy body elements to the central element, wherein the buoyancy body elements have, on their convex surface, at least one recess which extends transversely to their longitudinal axes and is intended for receiving at least one clamp.

\* \* \* \* \*